Patented Apr. 1, 1947

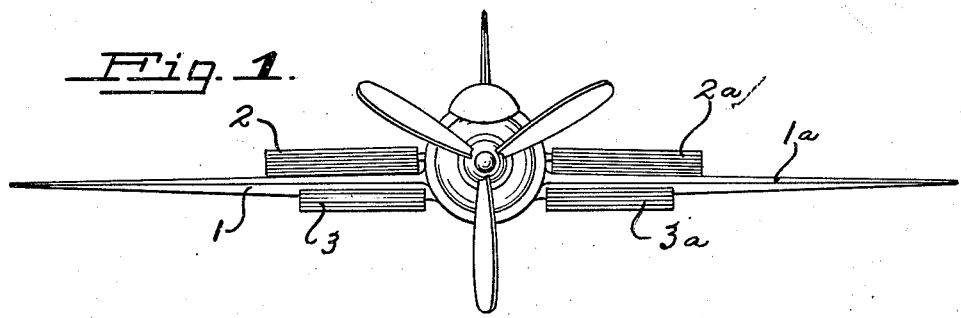
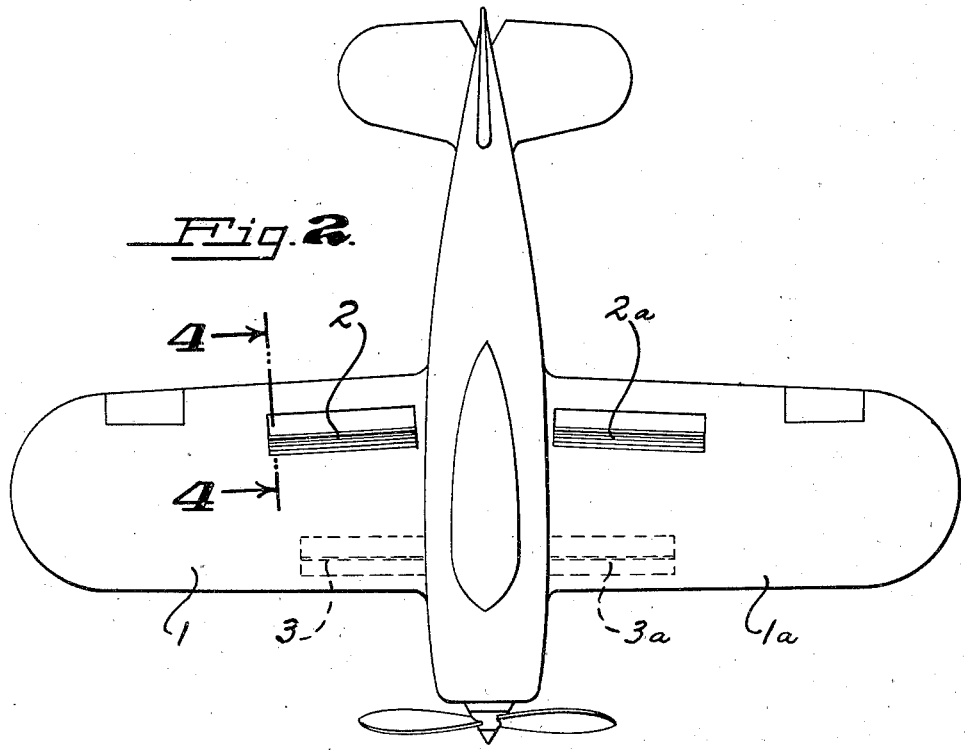
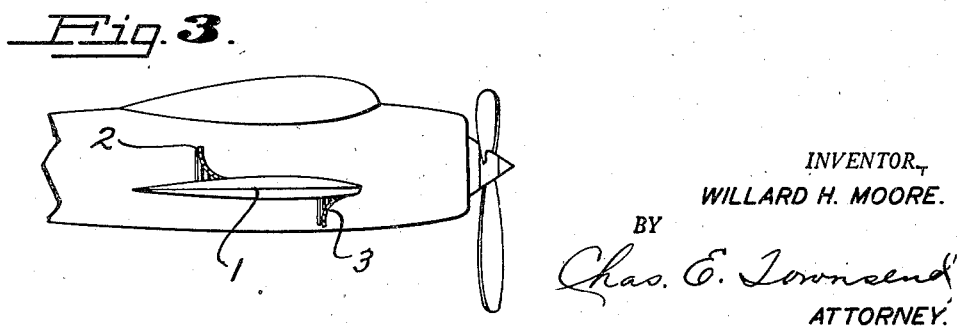

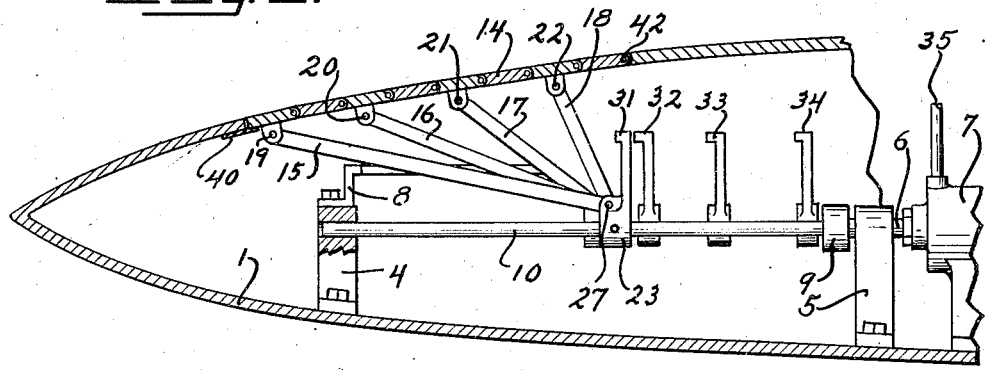
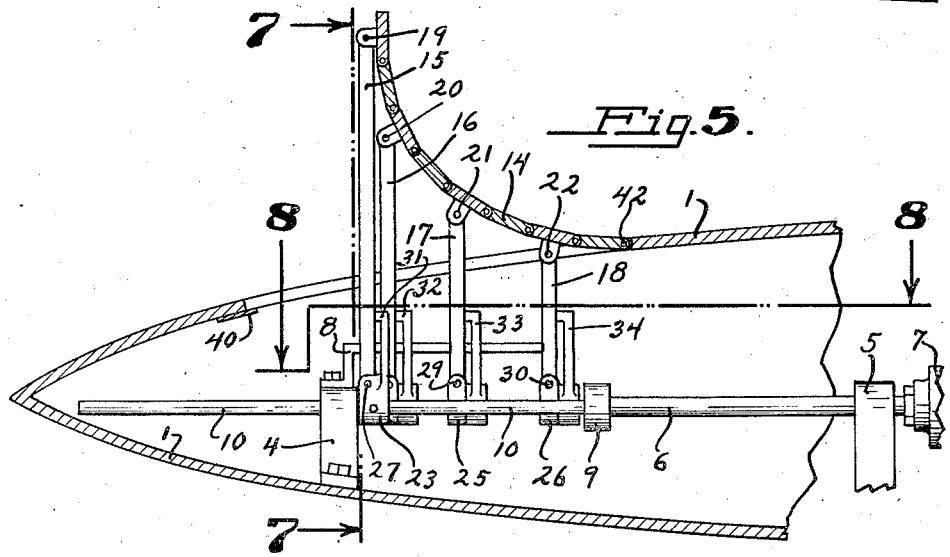
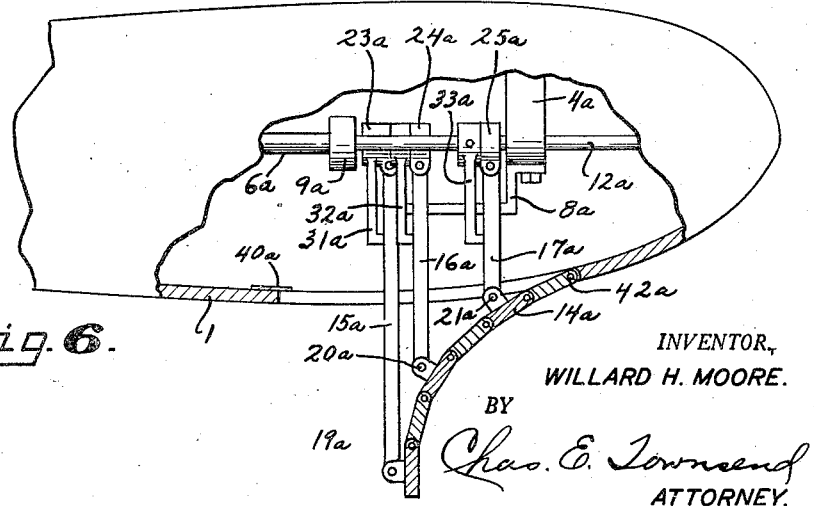

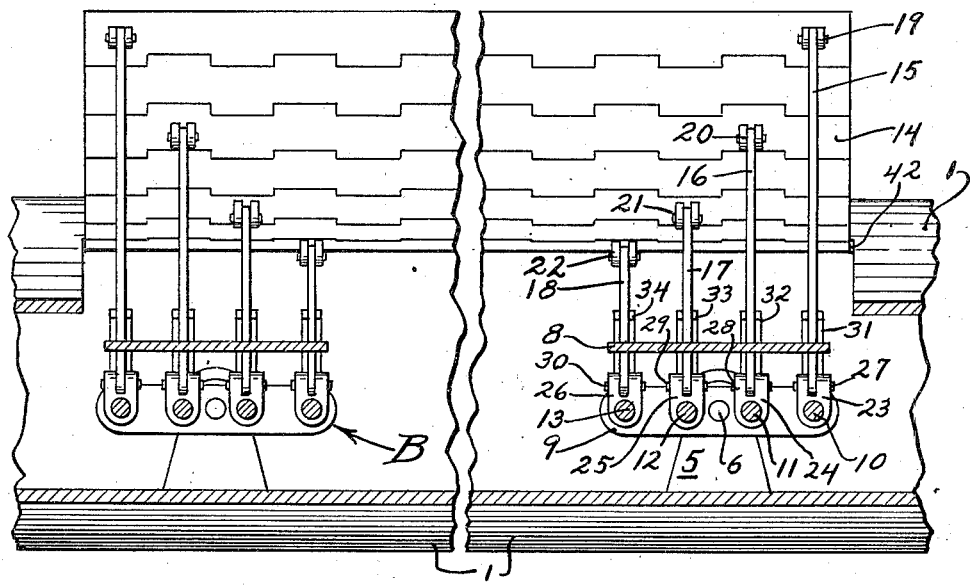
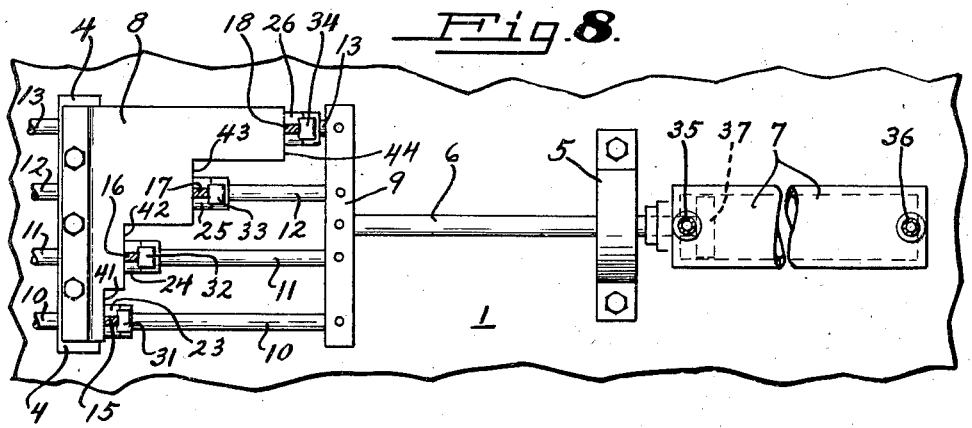

2,418,273

UNITED STATES PATENT OFFICE 2,418,273

AIRCRAFT WING FLAP ASSEMBLY

Willard H. Moore, Santa Rosa, Calif.

Application December 26, 1944, Serial No. 569,732

5 Claims. (Cl. 244—42)

The present invention relates to wing construction of airplanes and more particularly to an improved wing flap or lift assembly for airplanes.

It has become common practice in airplane construction to include a segment or flap in the wing surfaces which is manually operable by the pilot and which may be adjusted to modify the angle of attack of at least a portion of the wing surface. This effect is particularly desirable for increasing the lift action of the wing during take-off and for enabling stable flight at relatively low speed during landing of the airplane. For example, in carrier based airplanes it is necessary to attain sufficient lift to maintain the machine airborne after a relatively short take-off run during which it is generally difficult, if not impossible, to attain normal stable flight speed. Similarly, in landing on the deck of a carrier, it is desirable to operate the airplane at the lowest possible speed consistent with stable flight. Wing flaps are, of course, equally valuable and desirable for use on the various other types of aircraft, as for example commercial aircraft which are provided with auxiliary equipment of this type are capable of taking off and landing on much smaller landing fields with a given load than the same aircraft when not provided with these elements. Wing flaps also serve a useful purpose as a braking means for the airplane on which they are mounted, i. e., when in an elevated position they enable the pilot to reduce and control the speed of his machine more readily when landing or desired for other reasons. This effect is of particular advantage in certain types of military aircraft, notably torpedo carrying aircraft which must dive towards their objective at a high rate of speed as a defensive measure, level off and reduce their speed before releasing their torpedo and then climb rapidly out of range of the defense firepower which they normally encounter. Aircraft of this type are normally provided with wing flaps having relatively large surface areas in order to enable an approach to the target at a maximum speed for evasive tactics and then a rapid reduction of speed prior to the release of the torpedo.

It is an object of the present invention to provide an improved wing flap construction for airplane wings. A further object is to provide a wing flap construction enabling the flap surfaces to be positioned at a maximum angle with respect to the wing surfaces. Another object is to provide wing flaps which may be embodied in any desired part of the wing area, whether top or bottom, near the center or the leading or trailing edges. Still another object is to provide wing flaps which are perfectly aligned with the wing surfaces during normal flight, which are not subject to flutter or vibration when elevated and which are readily adaptable to various types of control and operating mechanisms.

Still further objects, together with some of the advantages to be derived in utilizing the wing flaps of the present invention, will become apparent from the following detailed description thereof, taken together with accompanying drawings forming a part of the specification and wherein:

Figure 1 is a front view of an airplane equipped with wing flaps according to the invention, the wingflaps being in elevated position.

Figure 2 is a plan view of an airplane as shown in Figure 1.

Figure 3 is a side view of an airplane as shown in Figures 1 and 2.

Figure 4 is an elevation, partly in section, through 4—4 of Figure 2 with wing flaps depressed.

Figure 5 illustrates the invention as in Figure 4 with the wing flap elevated.

Figure 6 is a fragmentary elevation, partly in section, illustrating the wing flap assembly as adapted for use in the botom face of a wing.

Figure 7 is an elevation through 7—7 of Figure 5.

Figure 8 is a fragmentary plan view through 8—8 of Figure 5.

Referring to Figures 1, 2 and 3, wing flaps according to the invention are shown as they appear when elevated in an installation on a conventional mid-wing monoplane. Flaps 2 and 2a are mounted on the upper faces of wings 1 and 1a respectively near the trailing edges thereof and flaps 3 and 3a are mounted on the bottom faces of wings 1 and 1a respectively near the leading edges thereof.

In Figures 4, 5, 7 and 8, bearing mounts 4 and 5 are mounted inside wing 1 as shown, bearing mount 5 slidably supporting shaft 6 and bearing mount 4 slidably supporting shafts 10, 11, 12 and 13, the latter being rigidly attached at one end to connector element 9 which is in turn rigidly attached to shaft 6. Wing flap 14 is formed of a plurality of pivotally connected strips or slats and forms an articulated unit, being mounted in a suitable aperture in the top face of wing 1. The edge of wing flap 14 nearest the leading edge of wing 1 is pivotally attached to and mounted flush with the wing surface at 42. The edge of wing flap 14 nearest the trailing edge of wing 1 rests on stop member 40 and is flush with the surface of the wing when in the depressed position shown in Figure 4. Radius rods 15, 16, 17 and 18 are pivotally attached to alternate strips of wing flap 14 at 19, 20, 21 and 22 respectively and similarly pivotally attached at their opposite ends to carrier members 23, 24, 25 and 26 respectively at 27, 28, 29 and 30 respectively. Carrier member 23 is rigidly mounted on rod 10 and carrier members 24, 25 and 26 are slidably mounted on rods 11, 12 and 13 respectively.

Support elements 32, 33 and 34 are rigidly mounted on shafts 11, 12 and 13 respectively, extending upwardly and terminating with an angular abutment directed rearwardly and towards the trailing edge of wing 1. Support element 31 is similarly shaped and formed as a part of carrier element 23. Brace plate 8 is rigidly mounted on the top of bearing mount 4 and is provided with a plurality of steps as at 41, 42, 43 and 44.

Hydraulic cylinder 7 is mounted adjacent bearing mount 5 and houses piston 37 which is connected to shaft 6. Hydraulic fluid is admitted to cylinder 7 on opposite sides of piston 37 through conduits 35 and 36.

The activating mechanism described above is duplicated at the opposite end of the wing flap with the elements at the mechanism disposed in mirror image, relationship, as generally indicated at B. In certain installations, as for example in the case of very large wing structures requiring proportionately large wing flaps, three or more activating units may be employed and spaced along the length of the wing flap.

In Figure 6, an embodiment of the invention is illustrated which may be employed for mounting a wing flap in the bottom surface of the wing. In this instance gearing mount 4a and a second bearing mount (not shown) are rigidly secured to the inside top portion of wing 1, shaft 6a being attached to connector element 9a which is in turn attached to a plurality of support shafts such as shown at 12a. Articulated wing flap 14a is pivotally attached to and flush with the bottom of the wing near the leading edge thereof at 42a, the trailing edge of wing flap 14a resting against stop member 40a when the wing flap is in the depressed position. Since wing flap 14a is not as wide as wing flap 14, three radius rods are sufficient to provide the required support, radium rods 15a, 16a and 17a being pivotally attached to alternate strips of wing flap 14a at 19a, 20a and 21a respectively and similarly pivotally attached at their opposite ends to carrier members 23a, 24a and 25a respectively. Carrier member 23a is rigidly mounted on its supporting shaft, whereas carrier members 24a and 25a are slidable with respect to their supporting shafts.

Support elements 32a and 33a are rigidly mounted on the same supporting shafts as carrier members 24a and 25a respectively, support elements 31a being formed as a part of carrier member 23a, each of the support elements depending downwardly in the same direction as the radius rods as shown. A hydraulic power unit (not shown) of the type shown at 7 of Figure 8 is attached to shaft 6a towards the trailing edge of wing 1 and behind the wing flap operating mechanism.

The operation of the wing flap is as follows: With the wing flap in the depressed position, as shown in Figure 4, hydraulic fluid is admitted to cylinder 7 (Figure 8) through conduit 36 under pressure, thus forcing piston 37 towards bearing mount 5 until the position shown in Figure 8 is reached. The movement of piston 37 causes a corresponding movement of shaft 6, connector element 9 and shafts 10 and 11, 12 and 13. As carrier member 23, which is rigidly attached to shaft 10, moves towards bearing mount 4, radius rod 15 raises the trailing edge of wing flap 14. As the wing flap is raised, radius rods 16, 17 and 18 are carried upwardly and towards bearing mount 4, carrier members 24, 25 and 26 sliding on shafts 11, 12 and 13 respectively. When carrier member 23 reaches the position shown particularly in Figures 5 and 8, it will be seen that carrier member 23 abuts bearing mount 4, radius rod 15 abuts step 41 of brace plate 8 and support element 31 abuts the opposite side of radius rod 15.

Support elements 32, 33 and 34, which are rigidly attached to shafts 11, 12 and 13 respectively, are so spaced with relation to each other that when the above described position of radius rod 15 is attained, radius rods 16, 17 and 18 abuts steps 42, 43 and 44 respectively of brace plate 8, being urged to this position by the action of support elements 32, 33 and 34 respectively. Each radius rod is thus firmly held against brace plate 8 and at the same time secured by the combined action of the support element at a point above the brace plate and the carrier member and support element at a point below the brace plate.

When the wing flap is to be lowered the pressure is relieved in conduit 36 and fluid admitted to cylinder 7 under pressure through conduit 35, thus forcing piston 37 towards conduit 36 and accordingly moving shaft 6, connector member 9 and shafts 10, 11, 12 and 13 in the same direction. Carrier member 23 and support elements 32, 33 and 34 are thus returned to the position shown in Figure 4, radius rod 15 securing the trailing edge of wing flap 14 against stop member 40. The wing flap is thus maintained locked in the depressed position as long as the hydraulic pressure is maintained in conduit 35.

The arrangement shown in Figure 6 functions in the same manner as described above with respect to the embodiment of Figures 4, 5, 7 and 8.

The strips forming the articulated wing flap unit may be formed of any material suitable for the structure of the wing itself, as for example, aluminum, Duraluminum, plywood or fabric over a wood or metal skeleton structure.

Particular advantages ascribed to the present construction are the facts that increased effectiveness is attained since the wing flap may be elevated to a position at a right angle to the surface of the wing, as shown in Figures 5 and 6, and at the same time, the wing flap is flush with the wing surface when depressed and offers no obstruction to streamline airflow over the wing surfaces. Further, rigid support is provided for the wing flap when the same is in the elevated position and the support structure is readily adapted for use with wing flaps having relatively large surface areas; additional radius rods being provided as flaps of greater width are employed. The hydraulic operating mechanism may be connected to the hydraulic systems conventionally employed for raising and lowering the landing gear, if desired. It will be appreciated, of course, that mechanical equivalents of the hydraulic actuating system may also be employed, as for example, a manually operable rack and pinion or screw drive may be utilized to reciprocate shaft 6 and may be of particular advantage on small aircraft which do not normally utilize hydraulic systems or on gliders and the like.

I claim:

1. In an aircraft wing flap assembly, the combination comprising an aircraft wing and a wing flap, said wing flap comprising three or more pivotally interconnected strips forming a bendable articulated unit, said articulated unit being pivotally attached along the leading edge thereof directly to said wing along the longitudinal axis of said wing so that said leading edge is always flush with the surface of said wing, said articulated unit being attached at the trailing edge thereof to a wing flap raising and lowering element, said last named means contained entirely within said wing when said flap is in a position flush with the surface of said wing.

2. In a wing flap assembly, the combination comprising an aircraft wing including a wing flap mounted thereon, said wing flap comprising three or more pivotally interconnected strips forming an articulated bendable unit, the leading edge of said articulated unit being pivotally attached directly to said wing along the longitudinal axis of said wing so that said leading edge is always flush with the surface of said wing, and means contained within said wing and attached to the trailing edge of said articulated unit whereby the trailing edge of said articulated unit may be raised and lowered, said last named means contained entirely within said wing when said flap is in a position flush with the surface of said wing.

3. In a wing flap assembly, the combination comprising an aircraft wing including a wing flap mounted flush with the surface thereof, said wing flap comprising three or more pivotally interconnected strips forming an articulated bendable unit, the longitudinal axes of said strips being parallel to the longitudinal axis of said wing, the leading edge of said articulated unit being pivotally attached to said wing so that said leading edge is always flush with the surface of said wing, a pair of radius rods pivotally attached to the trailing edge of said articulated unit on opposite sides thereof and means contained in said wing for raising and lowering said radius rods, said last named means contained entirely within said wing when said flap is in a position flush with the surface of said wing.

4. In a wing flap assembly, the combination comprising an aircraft wing including a wing flap mounted flush with the surface thereof, said wing flap comprising a plurality of pivotally connected strips forming an articulated unit, the longitudinal axes of said strips being parallel to the longitudinal axis of said wing, the leading edge of said articulated unit being pivotally attached to said wing, a pair of radius rods pivotally attached to the trailing edge of said articulated unit on opposite sides thereof, a pair of carrier members pivotally attached to and supporting said radius rods, a pair of shafts mounted on said wing perpendicular to the longitudinal axis of said wing and rigidly attached to and supporting said carrier members and means for reciprocating said shafts and thereby raising and lowering said radius rods.

5. In a wing flap assembly, the combination comprising an aircraft wing including a wing flap mounted flush with the surface thereof, said wing flap comprising a plurality of pivotally connected strips forming an articulated unit, the longitudinal axes of said strips being parallel to the longitudinal axis of said wing, the leading edge of said articulated unit being pivotally attached to said wing, a pair of radius rods pivotally attached to the trailing edge of said articulated unit on opposite sides thereof, a plurality of radius rods pivotally attached at one end to intermediate points between the leading and trailing edges of said wing flap, carrier members pivotally attached to and supporting said radius rods, a plurality of shafts mounted in said wing perpendicular to the longitudinal axis of said wing and supporting said carrier members, said carrier members supporting said radius rods attached to the trailing edge of said articulated unit being rigidly attached to their supporting shafts, said other carrier members being slidably mounted on their supporting shafts, a brace plate mounted in said wing above said carrier members and positioned to limit the travel of said radius rods toward the trailing edge of said articulated unit, means for reciprocating said shafts, means associated with said shafts urging said carrier members towards the trailing edge of said articulated unit when said shafts are moved towards the trailing edge of said articulated unit and support elements rigidly attached to said shafts and urging said radius rods against said brace plate when said radius rods are in elevated position.

WILLARD H. MOORE.

REFERENCES CITED

The following references are of record in the file of this patent:

UNITED STATES PATENTS

| Number | Name | Date |
|---|---|---|
| 1,299,111 | Boyea | Apr. 1, 1919 |
| 1,724,456 | Crook | Aug. 13, 1929 |
| 2,041,688 | Barnhart | May 26, 1936 |
| 2,070,705 | Barnhart | Feb. 16, 1937 |
| 2,146,014 | Grant | Feb. 7, 1939 |
| 2,332,465 | Lee et al. | Oct. 19, 1943 |
| 2,239,854 | McCormick | Apr. 29, 1941 |